(12) United States Patent
Lerch et al.

(10) Patent No.: US 8,916,826 B2
(45) Date of Patent: Dec. 23, 2014

(54) DIODE SENSOR MATRIX AND METHOD OF READING OUT A DIODE SENSOR MATRIX

(75) Inventors: Renee Lerch, Iserlohn (DE); Piotr Kropelnicki, Singapore (SG)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 393 days.

(21) Appl. No.: 13/474,897

(22) Filed: May 18, 2012

(65) Prior Publication Data

US 2012/0292513 A1 Nov. 22, 2012

(30) Foreign Application Priority Data

May 18, 2011 (DE) .......................... 10 2011 076 046

(51) Int. Cl.
*G01J 5/20* (2006.01)
*H01L 31/00* (2006.01)
*H04N 5/369* (2011.01)
*H04N 5/33* (2006.01)

(52) U.S. Cl.
CPC . *G01J 5/20* (2013.01); *H04N 5/369* (2013.01); *H04N 5/33* (2013.01)

USPC .................................................. 250/338.4

(58) Field of Classification Search
USPC .................................................. 250/338.4
See application file for complete search history.

(56) References Cited

U.S. PATENT DOCUMENTS 3,878,436 A * 4/1975 Bogel .............................. 361/72
2010/0220041 A1* 9/2010 Smith ............................. 345/82

* cited by examiner

*Primary Examiner* — Marcus Taningco
*Assistant Examiner* — Mindy Vu
(74) *Attorney, Agent, or Firm* — Michael A. Glenn; Perkins Coie LLP

(57) ABSTRACT

A diode sensor matrix including a multitude of diodes is configured to detect, in a first measuring cycle, a first sensor value at a first diode or at diodes of a first group of diodes while operating the first diode and/or the diodes of the first group in the flow direction and operating the diodes, which share an anode or cathode or terminal with the first diode or with any of the diodes of the first group, in the reverse direction, and to detect, in a second measuring cycle, a second sensor value at a second diode among the diodes which share an anode or cathode terminal with the first diode or with any of the diodes of the first group, while operating the second diode in the flow direction and operating the first diode or a diode from the first group in the reverse direction.

13 Claims, 10 Drawing Sheets

DIODE SENSOR MATRIX AND METHOD OF READING OUT A DIODE SENSOR MATRIX

CROSS-REFERENCE TO RELATED APPLICATIONS

This application claims priority from German Patent Application No. 102011076046.6, which was filed on May 18, 2011, and is incorporated herein in its entirety by reference.

Embodiments of the invention relate to a diode sensor matrix and a method of reading out a diode sensor matrix. For example, the diode sensor matrix may be a diode bolometer matrix for imaging infrared sensors.

BACKGROUND OF THE INVENTION

So-called bolometer matrices may be used for visually detecting infrared radiation. Said bolometer matrices typically consist of micromechanically produced sensor elements (e.g. on the basis of IR-sensitive resistors or diodes) that may be applied, for temperature decoupling, onto support posts above an active silicon substrate. Such individual sensors may be arranged in rows and columns, for example in a 2D grid. The sensor elements arranged in rows and columns correspond to the rows and columns of a rastered image. An electrical connection of the respective sensor elements to a readout circuit on a silicon substrate may be established by means of support posts on which the sensor elements are attached so as to be freely suspended. Due to limitations in manufacturing technology, a support post can only route one signal. For reading out a sensor signal which describes radiation impinging on a sensor element, two terminals of the sensor element may be connected to the readout circuit in each case.

FIG. 8 shows an arrangement 800 of sensor elements 810 that is known from conventional technology. The known arrangement 800 provides one support post 812, 814 each for one sensor element terminal. That is, there are two support posts 812, 814 for each sensor element in each case. In particular, the arrangement 800 shown in FIG. 8 represents a bolometer matrix without any shared support post. The terminals of the sensor elements 810 may be freely connected to a readout circuit to read out the sensor signals. In the known arrangement 800 in accordance with FIG. 8, there are no restrictions regarding the type of sensor elements 810.

FIG. 9 shows a known arrangement 900 of sensor elements 910 in accordance with EP 1530238 B1. In the known arrangement 900, one dedicated terminal is provided for each sensor element, respectively, the second terminal of the sensor element sharing a support post 914 with three further terminals of sensor elements with which it shares a corner (see FIG. 9). The arrangement 900 shown in FIG. 9 thus represents a bolometer matrix with a shared support post. The terminal shared via the shared support post 914 typically is at a constant potential. In the known arrangement 900 in accordance with FIG. 9, therefore, 1.25 support posts are associated with one sensor element. This is at the expense of a minor restriction with regard to the configuration of the sensor circuit. However, there are no restrictions regarding the type of sensor element.

A general problem of the arrangements of sensor elements described above is that the number of support posts per sensor element and, thus, area utilization is not optimized, which results in reduced sensitivity of the respective sensor elements.

SUMMARY

According to an embodiment, a diode sensor matrix may have: a multitude of diodes, wherein each of the diodes shares one anode terminal with at least one other diode and one cathode terminal with at least one further, different diode, the diode sensor matrix being configured to detect, in a first measuring cycle, a first sensor value at a first diode or, respectively, at diodes of a first group of diodes which share at least one anode or cathode terminal amongst themselves, respectively, specifically while operating the first diode and/or the diodes of the first group in the flow direction and while operating the diodes, which share an anode or cathode or terminal with the first diode or with any of the diodes of the first group, in the reverse direction, and to detect, in a second measuring cycle, a second sensor value at a second diode among the diodes which share an anode or cathode terminal with the first diode or with any of the diodes of the first group, specifically while operating the second diode in the flow direction and while operating the first diode or a diode from the first group, with which the second diode shares an anode or cathode terminal, in the reverse direction; the diode sensor matrix further including a first plurality of control lines configured to provide a first measuring potential or a second measuring potential; a second plurality of control lines configured to provide a first blocking potential and a second blocking potential; and a controller configured to connect the respective anode or cathode terminal of a diode of the multitude of diodes to a control line of the first multitude of control lines or to a control line of the second plurality of control lines in a switchable manner.

According to another embodiment, a method of reading out a diode sensor matrix including a multitude of diodes, wherein each of the diodes shares one anode terminal with at least one other diode and one cathode terminal with at least one further, different diode may have the steps of: detecting a first sensor value at a first diode or at diodes of a first group of diodes, respectively, which share at least one anode or cathode terminal amongst themselves, respectively, in a first measuring cycle, specifically while operating the first diode and/or the diodes of the first group in the flow direction and while operating the diodes, which share an anode or cathode terminal with the first diode or any of the diodes of the first group, in the reverse direction; and detecting a second sensor value at a second diode among the diodes, which shares an anode or cathode terminal with the first diode or any of the diodes of the first group, in a second measuring cycle, specifically while operating the second diode in the flow direction, and while operating the first diode or a diode from the first group, with which the second diode shares an anode or cathode terminal, in the reverse direction; providing a first plurality of control lines configured to provide a first measuring potential or a second measuring potential; providing a second plurality of control lines configured to provide a first blocking potential or a second blocking potential; and connecting the respective anode or cathode terminal of a diode of the multitude of diodes to a control line of the first plurality of control lines or to a control line of the second plurality of control lines in a switchable manner.

According to another embodiment, a computer program including a program code for performing the method of reading out a diode sensor matrix including a multitude of diodes, wherein each of the diodes shares one anode terminal with at least one other diode and one cathode terminal with at least one further, different diode, which method may have the steps of: detecting a first sensor value at a first diode or at diodes of a first group of diodes, respectively, which share at least one anode or cathode terminal amongst themselves, respectively, in a first measuring cycle, specifically while operating the first diode and/or the diodes of the first group in the flow direction and while operating the diodes, which share an anode or cathode terminal with the first diode or any of the diodes of the first group, in the reverse direction; and detecting a second sensor value at a second diode among the diodes, which shares an anode or cathode terminal with the first diode or any of the diodes of the first group, in a second measuring cycle, specifically while operating the second diode in the flow direction, and while operating the first diode or a diode from the first group, with which the second diode shares an anode or cathode terminal, in the reverse direction; providing a first plurality of control lines configured to provide a first measuring potential or a second measuring potential; providing a second plurality of control lines configured to provide a first blocking potential or a second blocking potential; and connecting the respective anode or cathode terminal of a diode of the multitude of diodes to a control line of the first plurality of control lines or to a control line of the second plurality of control lines in a switchable manner, when the computer program runs on a computer.

Embodiments of the present invention provide a diode sensor matrix comprising a multitude of diodes, wherein each of the diodes shares one anode terminal with at least one other diode and shares one cathode terminal with at least further, different diode. In this context, the diode sensor matrix is configured to detect, in a first measuring cycle, a first sensor value at a first diode or at respective diodes of a first group of diodes, which share at least one anode or cathode terminal amongst themselves, respectively, specifically while operating the first diode or the diodes of the first group in the flow direction and while operating the diodes, which share an anode or cathode terminal with the first diode or with any of the diodes of the first group, in the reverse direction, and to detect, in a second measuring cycle, a second sensor value at a second diode among the diodes, which shares an anode or cathode terminal with the first diode or any of the diodes of the first group, specifically while operating the second diode in the flow direction, and while operating the first diode or a diode from the first group, with which the second diode shares an anode or cathode terminal, in the reverse direction.

It is the core idea of the present invention that the above-mentioned improved area utilization and increased sensitivity and/or efficient and more accurate readout may be achieved when a multitude of diodes, wherein each of the diodes shares one anode terminal with at least one other diode and shares one cathode terminal with at least one further, different diode, are provided and when in a first measuring cycle, a first sensor value is detected at a first diode or at respective diodes of a first group of diodes, which share at least one common anode or cathode terminal amongst themselves, respectively, specifically while operating the first diode or the diodes of the first group in the flow direction and while operating the diodes, which share an anode or cathode terminal with the first diode or with any of the diodes of the first group, in the reverse direction, and when in a second measuring cycle, a second sensor value is detected at a second diode among the diodes, which shares an anode or cathode terminal with the first diode or any of the diodes of the first group, specifically while operating the second diode in the flow direction, and while operating the first diode or a diode from the first group, with which the second diode shares an anode or cathode terminal, in the reverse direction. In this manner, a number of support posts for shared anode and cathode terminals per diode and/or sensor element may be reduced. At the same time, disturbing effects of surrounding diodes and/or sensor elements on the diode and/or sensor element to be read out, respectively, may be avoided or at least suppressed as a result. Consequently, area utilization may be improved and sensitivity may be increased, on the one hand, and, thus, efficient or even more accurate readout of the diode sensor matrix may be achieved, on the other hand. In this context, one may make use of the sensitivity advantages of diodes with regard to temperature changes over ohmic resistors while exploiting their blocking capability.

In further embodiments of the present invention, each of the diodes shares the anode terminal and the cathode terminal with three other diodes. Thus, the number of support posts per diode and/or sensor element for shared anode and cathode terminals may be reduced to 0.5.

In further embodiments of the present invention, the number of cycles for reading out the diode sensor matrix is 9 when the sensor values are detected at the first and second diodes, whereas the number of cycles for reading out the diode sensor matrix is 4 when the sensor values are detected, respectively, at the diodes of the first group and at diodes of a second group, which includes the second diode. Thus, by reading out several groups of diodes and/or sensor elements, which share at least one anode or cathode terminal amongst themselves, respectively, the number of cycles for reading out the diode sensor matrix and/or the multiplexing factor may be reduced from 9 to 4.

Further embodiments of the present invention provide a method of reading out a diode sensor matrix comprising a multitude of diodes, wherein each of the diodes shares one anode terminal with at least one other diode and one cathode terminal with at least one further, different diode, the method comprising the following steps. Initially, a first sensor value is detected, in a first measuring cycle, at a first diode or at diodes of a first group of diodes, respectively, which share at least one anode or cathode terminal amongst themselves, respectively, specifically while operating the first diode and/or the diodes of the first group in the flow direction and while operating the diodes, which share an anode or cathode terminal with the first diode or any of the diodes of the first group, in the reverse direction. Subsequently, a second sensor value is detected, in a second measuring cycle, at a second diode among the diodes, which shares an anode or cathode terminal with the first diode or any of the diodes of the first group, specifically while operating the second diode in the flow direction, and while operating the first diode or a diode from the first group, with which the second diode shares an anode or cathode terminal, in the reverse direction.

BRIEF DESCRIPTION OF THE DRAWINGS

Embodiments of the present invention will be detailed subsequently referring to the appended drawings, in which:

FIG. 5b shows a perspective view of the embodiment of the diode bolometer in accordance with FIG. 5a;

DETAILED DESCRIPTION OF THE INVENTION

Figure 1:
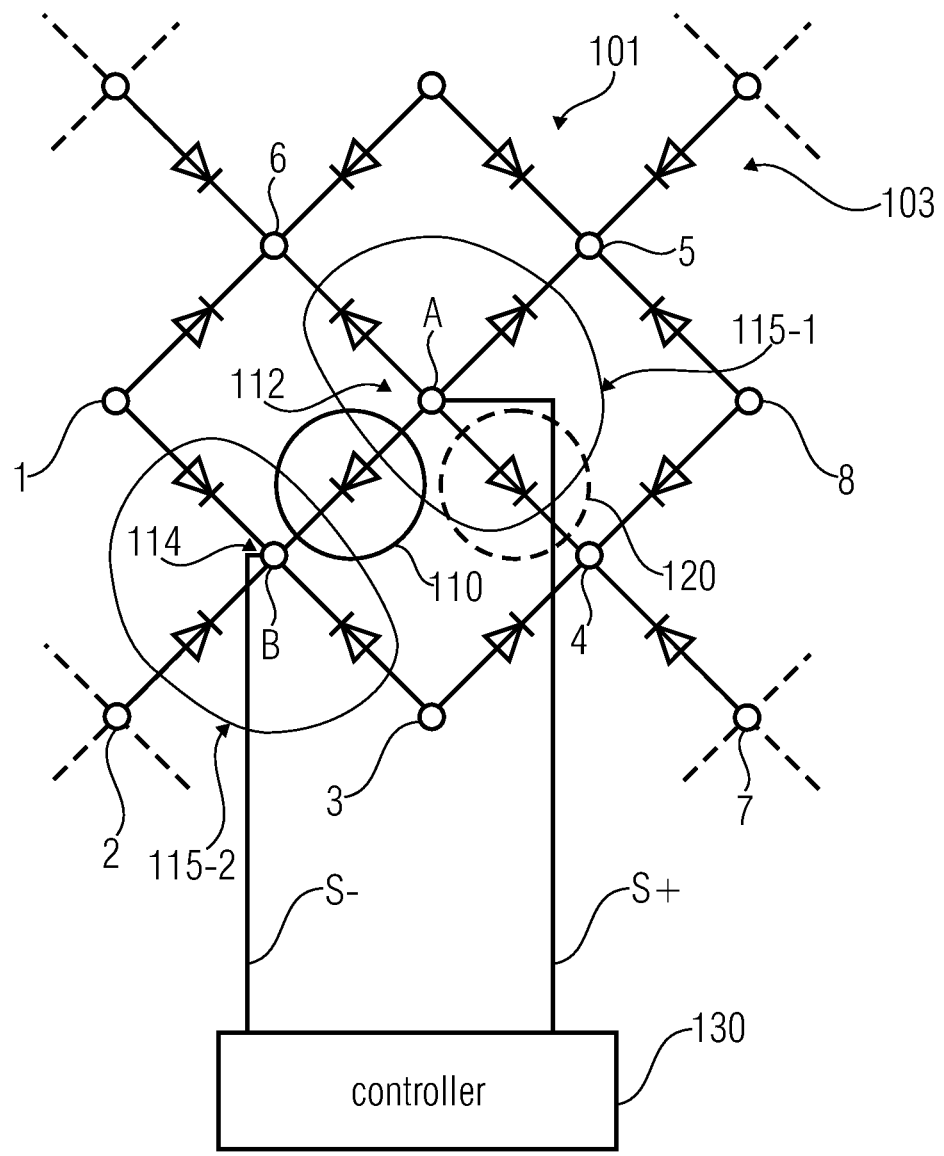
FIG. 1 shows a schematic representation of a diode sensor matrix in accordance with an embodiment of the present invention.

Before explaining the present invention in more detail below with reference to the figures, it shall be pointed out that, in the embodiments presented below, elements that are identical or have identical functions are provided with identical reference numerals in the figures. Therefore, descriptions of elements having identical reference numerals are mutually exchangeable and/or applicable to one another in the various embodiments.

FIG. 1 shows a schematic representation of a diode sensor matrix 100 in accordance with an embodiment of the present invention. As is shown in FIG. 1, the diode sensor matrix 100 comprises a multitude 101 of diodes, wherein each of the diodes shares one anode terminal with at least one other diode and one cathode terminal with at least one further, different diode. In the diode sensor matrix 100 shown in FIG. 1, each of outer diodes 103 shares only one cathode terminal with three other diodes, and does not share an anode terminal with another diode. It is to be noted here that, by way of example, FIG. 1 shows only a section of a diode sensor matrix; it is possible for the diode sensor matrix to comprise further diodes which are linked to and continue from the anode terminals of the outer diodes 103, as is indicated by the dashed lines. In embodiments in accordance with FIG. 1, the diode sensor matrix 100 may be configured to detect, in a first measuring cycle, a first sensor value at a first diode 110, specifically while operating the first diode 110 in the flow direction and while operating the diodes 115-1, 115-2, which share an anode terminal 112, A, or cathode terminal 114, B, with the first diode 110, in the reverse direction. In addition, diode sensor matrix 100 may be configured to detect, in a second measuring cycle, a second sensor value at a second diode 120 among the diodes 115-1, 115-2, which shares the anode terminal 112, A, or cathode terminal 114, B with the first diode 110, specifically while operating the second diode 120 in the flow direction and while operating the first diode 110 in the reverse direction. By operating the first diode 110 in the flow direction while operating the surrounding diodes 115-1, 115-2 in the reverse direction, the first sensor value may be detected at the first diode 110 in the first measuring cycle without the surrounding diodes 115-1, 115-2 having a disturbing effect. In addition, by operating the second diode 120 in the flow direction while operating the first diode 110 in the reverse direction, the second sensor value may be detected at the second diode 120 in the second measuring cycle without the first diode 110 having a disturbing effect. By means of the above approach, additional currents at the shared anode terminal 112 or cathode terminal 114 and/or on the measuring nodes A, B for detecting the first sensor value in the first measuring cycle and additional currents on the measuring nodes for detecting the second sensor value in the second measuring cycle may be suppressed.

In further embodiments in accordance with FIG. 1, the diode sensor matrix 100 may further comprise a controller 130. The controller 130 shown in FIG. 1 may be configured to apply, in the first measuring cycle, a first measuring potential S+ to the anode terminal 112 and a second measuring potential S− to the cathode terminal 114 of the first diode 110. FIG. 1 represents, by way of example, application of the measuring potentials S+, S− to the anode terminal A and the cathode terminal B of the first diode 110 in the first measuring cycle on the part of the controller 130. In addition, the controller 130 may be configured to apply, in the second measuring cycle, the first measuring potential S+ to the anode terminal 112, A, and to apply the second measuring potential S− to the cathode terminal 4 of the second diode 120. In the embodiment shown in FIG. 1, the first measuring potential S+ may be larger, in the first and second measuring cycles, than the second measuring potential S−, so that the first diode 110 may be operated in the flow direction in the first measuring cycle, and the second diode 120 may be operated in the flow direction in the second measuring cycle.

In embodiments, the controller 130 shown in FIG. 1 may be configured, in the first measuring cycle, to apply a first blocking potential V+ to the cathode terminals 4, 5, 6 of the diodes 115-1, which share an anode terminal 112 with the first diode 110, and to apply a second blocking potential V− to the anode terminals 1, 2, 3 of the diodes 115-2, which share a cathode terminal 114 with the first diode 110. In addition, the controller 130 shown in FIG. 1 may be configured, in the second measuring cycle, to apply the first blocking potential V+ to the cathode terminals 5, 6, 114 of the diodes, which share an anode terminal with the second diode 120, and to apply the second blocking potential V− to the anode terminals 3, 7, 8 of the diodes, which share a cathode terminal 4 with the second diode 120. In the embodiment shown in FIG. 1, the measuring potentials S+, S− and the blocking potentials V+, V−, which may be applied by the controller 130, may be selected such that in the first and second measuring cycles, the first measuring potential S+ is larger than the second measuring potential S−, and that in the first and second measuring cycles, the first measuring potential S+ is smaller than the first blocking potential V+, and the second measuring potential S− is larger than the second blocking potential V−. This setting of the measuring and blocking potentials S+, S−, V+, V− enables that, when detecting the respective sensor values, the diodes to be read out may be operated in the flow direction in the first and second measuring cycles, respectively, while the surrounding diodes may be operated in the reverse direction, respectively. As a result, the respective sensor values may be detected, at the diodes to be read out, essentially without any disturbing effects caused by the surrounding diodes, and/or the diodes to be read out may be read out more accurately. In summary, FIG. 1 illustrates readout of a diode and/or of an element (circled in) via of the terminals A and B. The terminals 1, 2, 3 may be set to V−, whereas the terminals 4, 5, 6 may be set to V+.

Figure 2:
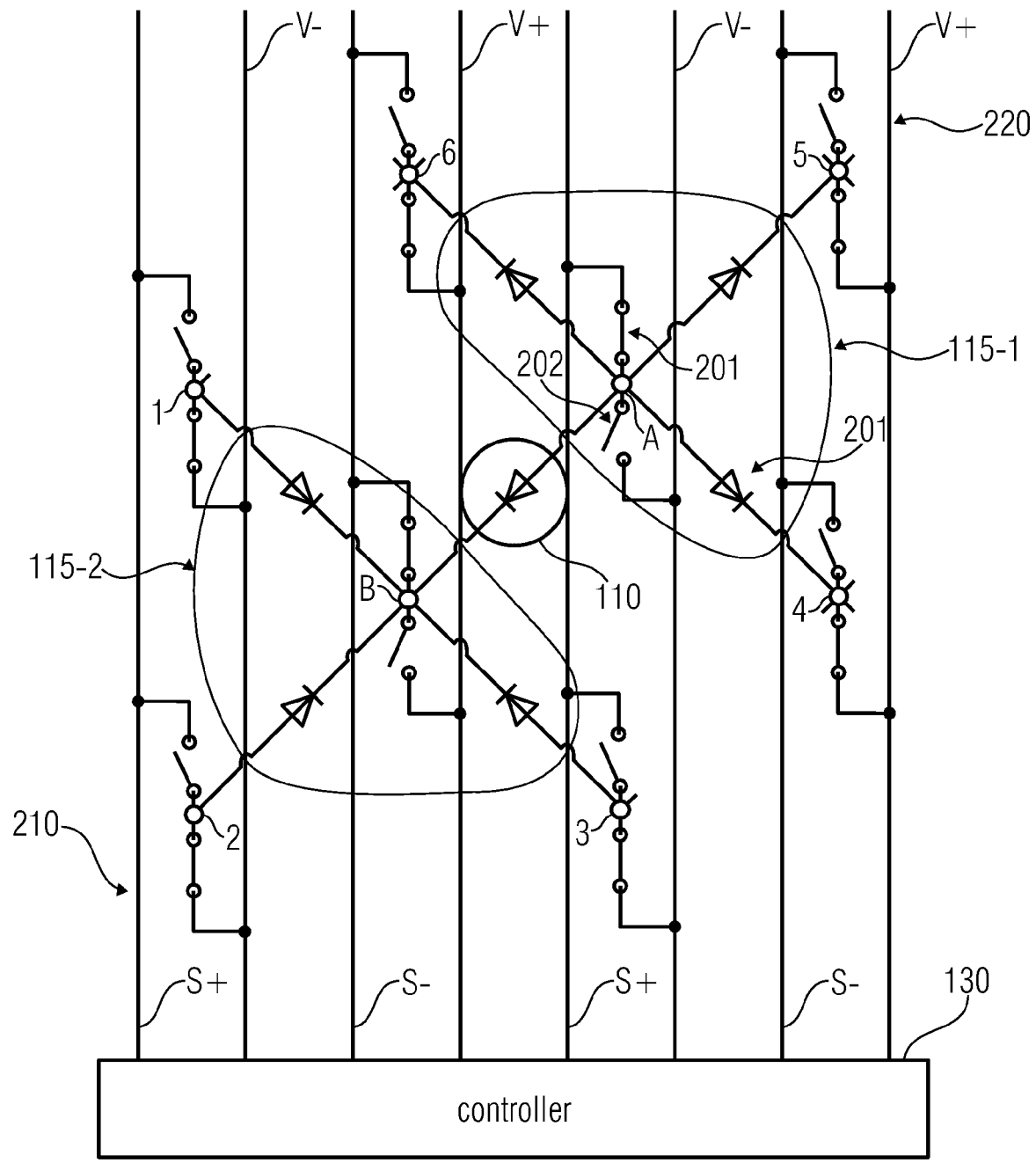
FIG. 2 shows a schematic representation of a diode sensor matrix comprising a controller and first and second pluralities of control lines in accordance with a further embodiment of the present invention.

FIG. 2 shows a schematic representation of a diode sensor matrix 200 comprising a controller 130 and first and second pluralities 210, 220 of control lines in accordance with a further embodiment of the present invention. Here, the diode sensor matrix 200 comprising a multitude 201 of diodes in FIG. 2 essentially corresponds to the diode sensor matrix 100 comprising the multitude 101 of diodes in FIG. 1. In addition, FIG. 2 shows the first diode 110 and the surrounding diodes 115-1, 115-2. In particular, FIG. 2 shows a more detailed view of the diode sensor matrix for reading out a diode and/or an element (circled in). The diode sensor matrix 200 shown in FIG. 2 comprises a first plurality 210 of control lines and a second plurality 220 of control lines. The control lines of the first plurality 210 are configured to provide a first measuring potential S+ or a second measuring potential S−. The control lines of the second plurality 220 are configured to provide a first blocking potential V+ and a second blocking potential V−. In the embodiment shown in FIG. 2, the controller 130 may be configured to connect the respective anode or cathode terminal of a diode of the multitude 201 of diodes to a control line of the first plurality 210 of control lines or to a control line of the second plurality 220 of control lines in a switchable manner. In particular, FIG. 2 shows that the anode or cathode terminals and/or nodes A, B, 1, 2, 3, 4, 5, 6 each may be connected, via a first switch 201, to a control line of the first plurality 210 of control lines for the first measuring potential S+ or the second measuring potential S−, and via a second switch 202 to a control line of the second plurality 220 of control lines for the first blocking potential V+ or the second blocking potential V−. Thus, two switches may be provided for each node, or support post, it being possible to provide the first measuring potential S+ or the second measuring potential S− via a first switch, and to provide the first blocking potential V+ or the second blocking potential V− for the respective node via a second switch.

In embodiments, the blocking potentials V+, V−, which are provided by the second plurality 220 of control lines, may be constant potentials.

Figure 3:
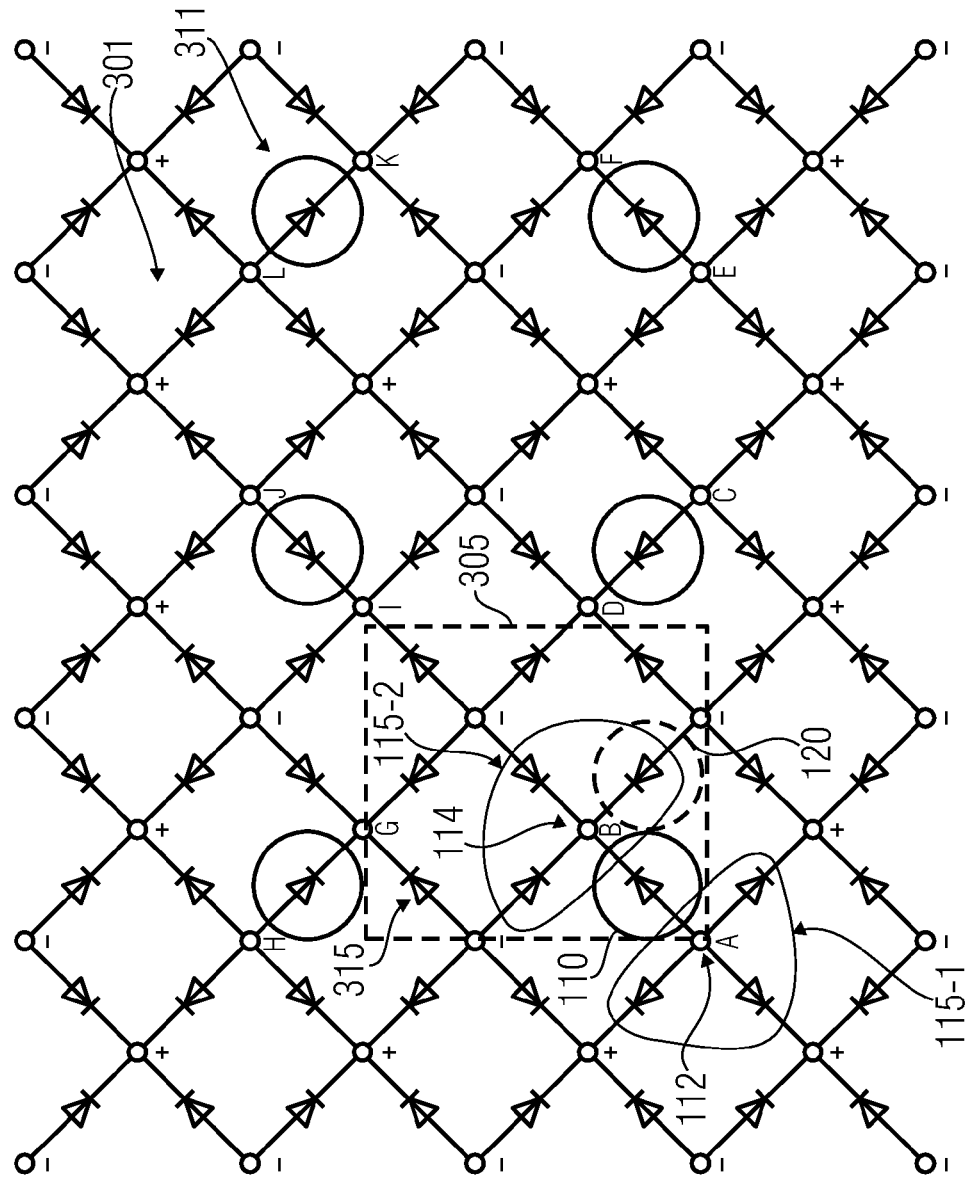
FIG. 3 shows a schematic representation of a diode sensor matrix for detecting sensor values at a first diode and at a second diode in accordance with a further embodiment of the present invention.

FIG. 3 shows a schematic representation of a diode sensor matrix 300 for detecting sensor values at first and second diodes 110, 120 in accordance with a further embodiment of the present invention. Here, the diode sensor matrix 300 comprising a multitude 301 of diodes in FIG. 3 essentially corresponds to the diode sensor matrix 100 comprising the multitude 101 of diodes in FIG. 1. In addition, FIG. 3 shows the surrounding diodes and/or the diodes 115-1, 115-2, which share an anode or cathode terminal A, B with the first diode 110. As is described by means of the embodiment shown in FIG. 1, the diode sensor matrix 300 in accordance with FIG. 3 may be configured to detect, in a first measuring cycle, a first sensor value at the first diode 110, specifically while operating the first diode 110 in the flow direction and while operating the surrounding diodes 115-1, 115-2 in the reverse direction, and to detect, in the second measuring cycle, a second sensor value at the second diode 120 among the surrounding diodes 115-1, 115-2, specifically while operating the second diode 120 in the flow direction and while operating the first diode 110 in the reverse direction. In embodiments in accordance with FIG. 3, sensor values may be detected at a multitude of diodes to be read out, the surrounding diodes being operated in the reverse direction, respectively, so that no additional currents on the anode or cathode terminals and/or measuring nodes of the diodes to be read out are caused by the surrounding diodes. As a result, the diode sensor matrix 300 may be read out more effectively and accurately.

In the embodiment shown in FIG. 3, the diodes 301 of the diode sensor matrix 300 may share the anode terminal and the cathode terminal with three other diodes, respectively. As a result, the number of support posts (nodes) per sensor element and/or diode may be reduced to 0.5.

In embodiments in accordance with FIG. 3, a number of cycles for reading out the diode sensor matrix 300 is nine when the sensor values are detected at the first and second diodes 110, 120. In particular, the diode sensor matrix 300 shown in FIG. 3 may be read out in that the sensor values are detected, in nine subsequent measuring cycles, at nine different diodes 315 of a section 305 of the diode sensor matrix 300.

In the embodiment shown in FIG. 3, the sensor values of several sensor elements and/or diodes 311 (circled-in elements having the terminals A, B; C, D; E, F; G, H; I, J; K, L) of the diode sensor matrix 300 may be detected at the same time and/or the sensor elements may be read out at the same time. With regard to FIG. 3, diodes of mutually offset sections, which correspond to the section 305, may be read out at the same time on the basis of the individual sensor elements (diodes 311), so that the entire diode sensor matrix 300 may be read out in nine cycles. In other words, FIG. 3 shows a diode sensor matrix for simultaneously reading out several diodes and/or sensor elements (circled in). In embodiments, the nodes A-L may be connected in pairs to one electronic readout system, respectively. The nodes and/or support posts designated by "+" may be connected to V+ via a controller, whereas the nodes and/or support posts designated by "−" may be connected to V− via the controller.

Figure 4:
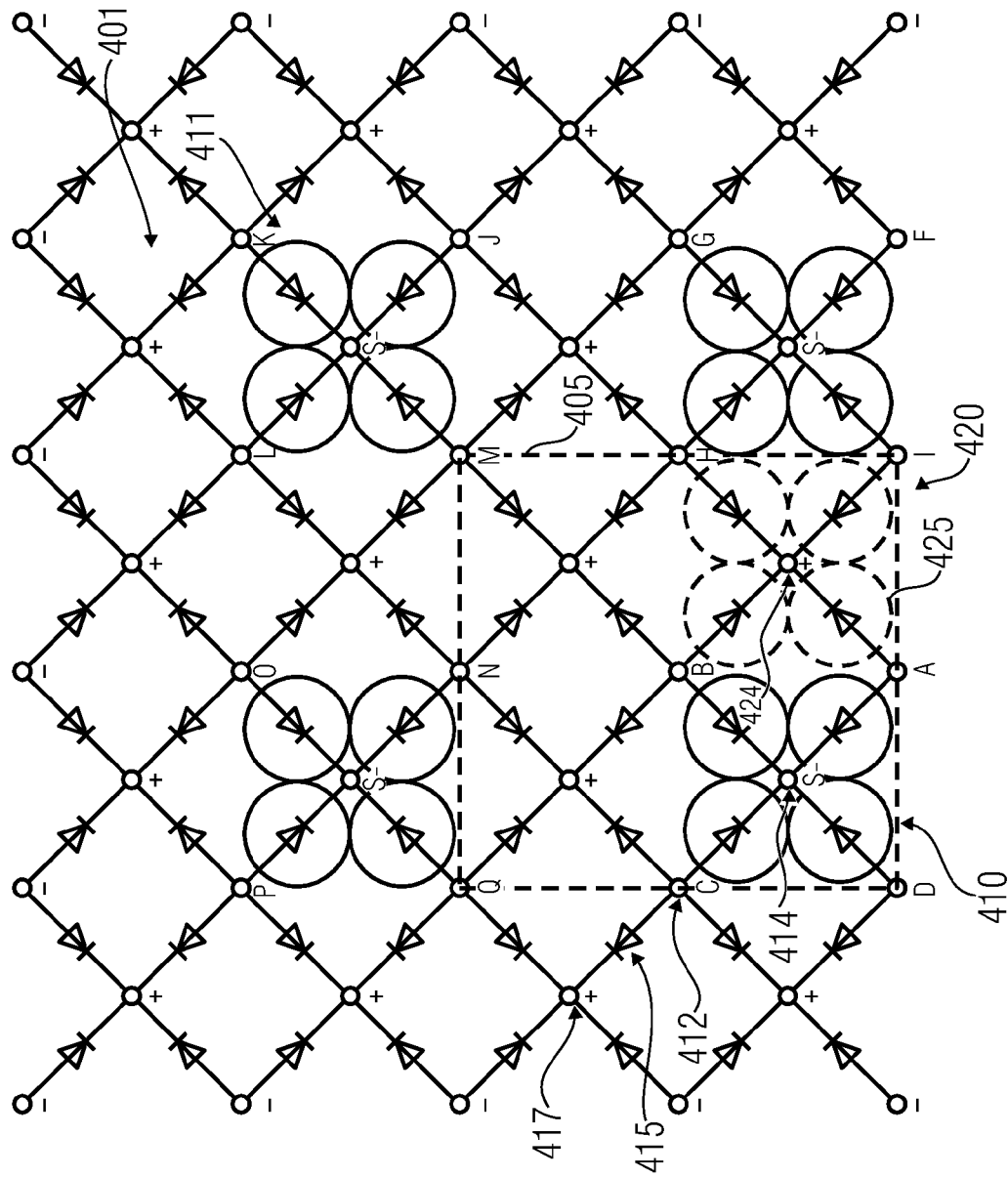
FIG. 4 shows a schematic representation of a diode sensor matrix for detecting sensor values at diodes of a first group and at diodes of a second group, respectively, in accordance with a further embodiment of the present invention.

FIG. 4 shows a schematic representation of a diode sensor matrix 400 for detecting sensor values at diodes of a first group 410 and at diodes of a second group 420, respectively, in accordance with a further embodiment of the present invention. The diode sensor matrix 400 comprising a multitude 401 of diodes in FIG. 4 essentially corresponds to the diode sensor matrix 100 comprising the multitude 101 of diodes in FIG. 1. In particular, FIG. 4 illustrates simultaneous readout of several sensor elements (circled in) having a potential which is constant, for example, at a respective terminal S−. In this context, the nodes A to Q may be connected to an electronic readout system, respectively. The support posts and/or nodes designated by "+" may be connected to V+, whereas the support posts and/or nodes designated by "−" may be connected to V−. In the embodiment shown in FIG. 4, the diode sensor matrix 400 is configured to detect, in a first measuring cycle, a first sensor value at respective diodes of a first group 410 of diodes, which share at least one anode or cathode terminal amongst themselves, respectively, specifically while operating the diodes of the first group 410 in the flow direction and while operating the diodes 415, which share an anode or cathode terminal with any of the diodes of the first group 410, in the reverse direction. In addition, the diode sensor matrix 400 in the embodiment shown in FIG. 4 is configured to detect, in a second measuring cycle, a second sensor value at a second diode 425 among the diodes 415, which shares an anode or cathode terminal (e.g. terminal A) with any of the diodes of the first group 410, specifically while operating the second diode 425 in the flow direction, and while operating a diode from the first group 410, with which the second diode 425 shares an anode or cathode terminal (e.g. terminal A), in the reverse direction.

As is shown in FIG. 4, the diodes of the first group 410 share at least one cathode terminal 414 amongst themselves, respectively, whereas the diodes of the second group 420 share at least one cathode terminal 424 amongst themselves, respectively. In FIG. 4, the diodes of the first group 410 are depicted as sensor elements and/or diodes circled in by continuous lines, whereas the diodes of the second group 420 are depicted as sensor elements and/or diodes that are circled in by dashed lines. Each of the diodes 415 and/or the surrounding diodes shown in FIG. 4 shares, e.g., one anode terminal 412 with any of the diodes of the first group 410. In the embodiment of FIG. 4, the first sensor value may be detected at diodes of the first group 410 in the first measuring cycle in that the diodes of the first group 410 are operated in the flow direction, while the surrounding diodes 415 are operated in the reverse direction, whereby disturbing influences caused by the surrounding diodes 415 and acting on the shared anode terminals 412 and/or on the nodes A, B, C, D, shown in FIG. 4, of the diodes of the first group 410, are avoided or at least suppressed. In addition, in the embodiment of FIG. 4, the second sensor value may be detected at the second diode 425 in the second measuring cycle in that the second diode 425 is operated in the flow direction while a diode from the first group 410, with which the second diode 425 shares an anode terminal (e.g. node A), is operated in the reverse direction, so that the diode with which the second diode 425 shares the anode terminal causes no additional currents at the shared anode terminal (e.g. node A) and thus has no disturbing effect.

Alternatively, the diodes of the first and/or second groups 410, 420 may share at least one anode terminal amongst themselves, respectively (not shown in FIG. 4). In this case, the surrounding diodes share a cathode terminal with any of the diodes of the first group.

The diode sensor matrix 400 shown in FIG. 4 may further comprise a controller which essentially corresponds to the controller 130 shown in FIG. 1. In particular, the controller of the diode sensor matrix 400 may be configured, in the first measuring cycle, to apply a first measuring potential S+, S− to the at least one shared anode or cathode terminal, and to apply a second measuring potential S−, S+ to the respective other cathode or anode terminal of the diodes of the first group 410. In addition, the controller of the diode sensor matrix 400 may be configured, in the second measuring cycle, to apply the respective first measuring potential S+, S− to a shared anode or cathode terminal of diodes of a second group 420, which includes the second diode 425, and to apply the second measuring potential S−, S+ to the respective other cathode or anode terminal of the diodes of the second group 420.

In the embodiment shown in FIG. 4, in the first measuring cycle, the respective first measuring potential S− may be applied to the at least one shared cathode terminal 414, and the second measuring potential S+ may be applied to the respective other anode terminal 412 of the diodes of the first group 410. In addition, in the second measuring cycle, the respective first measuring potential S− may be applied to a shared cathode terminal 424 of diodes of the second group 420, which includes the second diode 425, and the second measuring potential S+ may be applied to the respective other anode terminal (e.g. nodes A, B, I, H) of the diodes of the second group 420.

Alternatively, in the first measuring cycle, a respective first measuring potential S+ may be applied to the at least one shared anode terminal, and a second measuring potential S− may be applied to the respective other cathode terminal of the diodes of the first group (410). In addition, in the second measuring cycle, the respective first measuring potential S+ may be applied to a shared anode terminal of diodes of a second group (420), which includes the second diode (425), and the second measuring potential S− may be applied to the respective other cathode terminal of the diodes of the second group (420).

With reference to FIG. 4, the controller of the diode sensor matrix 400 may be configured to apply, in the first measuring cycle, a respective first blocking potential V+ to the cathode terminals 417 of the diodes 415, which share an anode terminal 412 with any of the diodes of the first group 410, and to apply, in the second measuring cycle, the respective first blocking potential V+ to the cathode terminals of the diodes, which share an anode terminal A, B, H, I with any of the diodes of the second group 420, when the diodes of the first and second groups 410, 420 share at least the cathode terminal 414, 424 amongst themselves, respectively. In this context, in the first and second measuring cycles, the second measuring potential S+ applied to the respective other anode terminal A, B, C, D; A, B, H, I may be larger than the first measuring potential S− applied to the at least one shared cathode terminal 414, 424. In addition, in the first and second measuring cycles, the second measuring potential S+ applied to the respective other anode terminal A, B, C, D; A, B, H, I may be smaller than the first blocking potential V+ when the diodes of the first and second groups 410, 420 share at least the cathode terminal 414, 424 amongst themselves, respectively.

Alternatively, in the first measuring cycle, a second blocking potential V− may be applied to the anode terminals of the diodes which share a cathode terminal with any of the diodes of the first group (410), and in the second measuring cycle, alternatively, the second blocking potential V− may be applied to the anode terminals of the diodes which share a cathode terminal with any of the diodes of the second group (420), when the diodes of the first and second groups 410, 420 share at least the anode terminal amongst themselves, respectively. In this context, in the first and second measuring cycles, the first measuring potential S+ applied to the at least one shared anode terminal may be larger than the second measuring potential S− applied to the respective other cathode terminal. In addition, in the first and second measuring cycles, the second measuring potential S− applied to the respective other cathode terminal may be larger than the second blocking potential V− when the diodes of the first and second groups (410, 420) share at least the anode terminal amongst themselves, respectively.

In the embodiment shown in FIG. 4, a number of the diodes of the first and second groups 410, 420 of the diode sensor matrix 400 is four.

In addition, in the embodiment of FIG. 4, a number of cycles for reading out the diode sensor matrix 400 is four when the sensor values are detected at the respective diodes of the first group 410 and at the respective diodes of the second group 420. FIG. 4 shows a section 405 of the diode sensor matrix 400, the section 405 including the first and second groups 410, 420. It may be seen by means of FIG. 4 that all of the diodes of the section 405 of the diode sensor matrix 400 may be read out in that the sensor values in the first and second measuring cycles are each detected at respective diodes of the first and second groups 410, 420 and, in two further consecutive measuring cycles, are detected at respective diodes of two further groups of the section 405 comprising four diodes in each case. In the embodiment of FIG. 4, only four cycles may thus be used for reading out the section 405 of the diode sensor matrix 400.

The diode sensor matrix 400 shown in FIG. 4 includes several groups 411 of four diodes each, the diodes of each of the groups 411 sharing, e.g., at least one cathode terminal amongst themselves, respectively. In the embodiment of FIG. 4, the several groups 411 may be read out simultaneously in that, in the first measuring cycle, the first sensor value is detected at respective diodes of each of the groups 411, specifically while operating the diodes of each of the groups 411 in the flow direction and while operating the surrounding diodes or the diodes connected to the terminals and/or nodes A, B, C, D; F, G, H, I; J, K, L, M and N, O, P, Q, in the reverse direction. In addition, in the embodiment of FIG. 4, mutually offset sections of the diode sensor matrix 400, which include the section 405, may be read out on the basis of the several groups 411, so that, in the first measuring cycle, the first sensor value is detected at respective diodes of the first group 410, in the second measuring cycle, the second sensor value is detected at respective diodes of the second group 420, and, in two further consecutive measuring cycles, the remaining sensor values are detected at respective diodes of two further groups of the respective sections. Thus, in the embodiment of FIG. 4, the entire diode sensor matrix 400 may be read out in four cycles, whereas in the embodiment of FIG. 3, nine cycles may be used for reading out the entire diode sensor matrix 300.

Figure 5A:
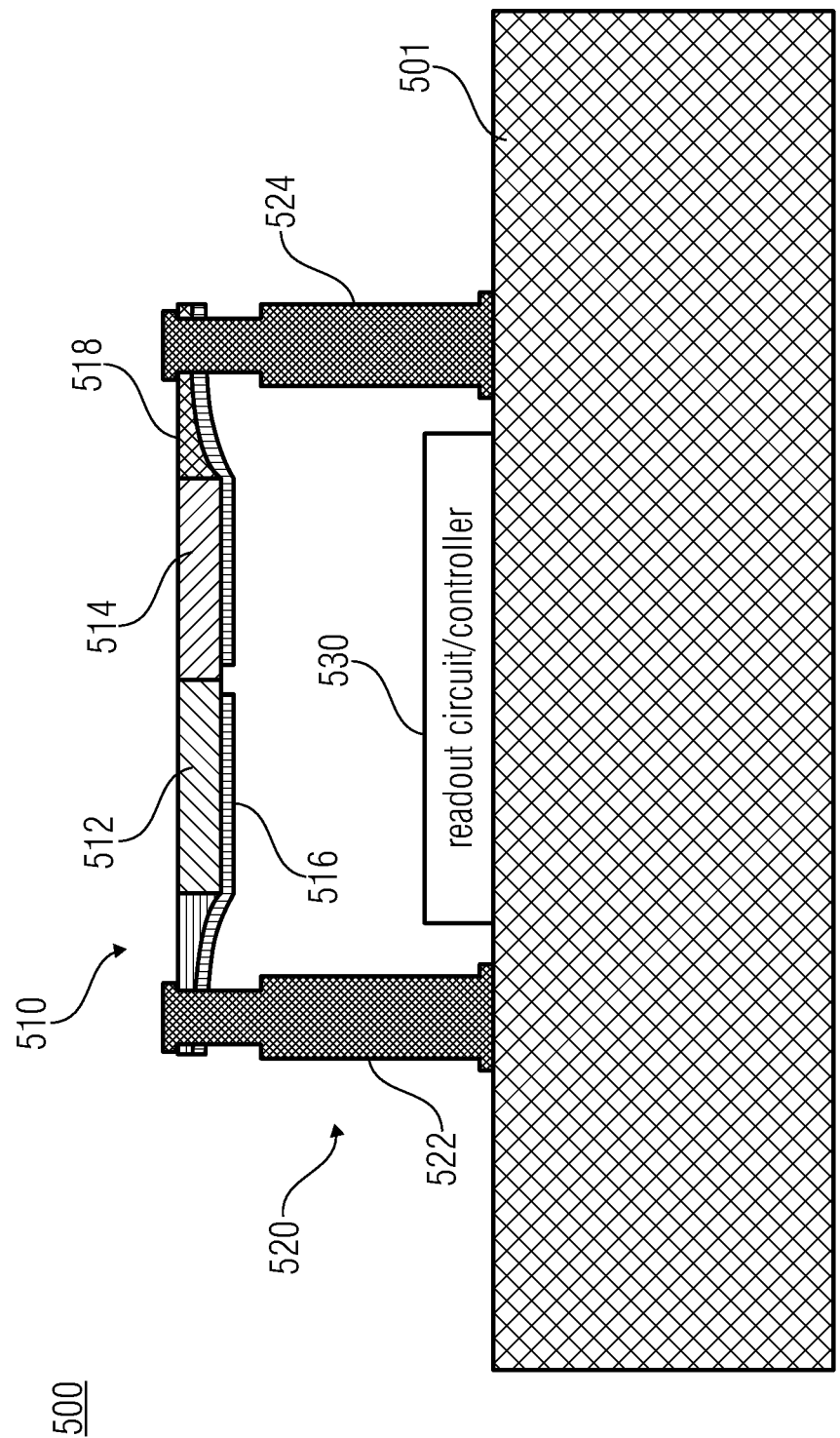
FIG. 5a shows a cross-sectional view of an embodiment of a diode bolometer.
Figure 5B:
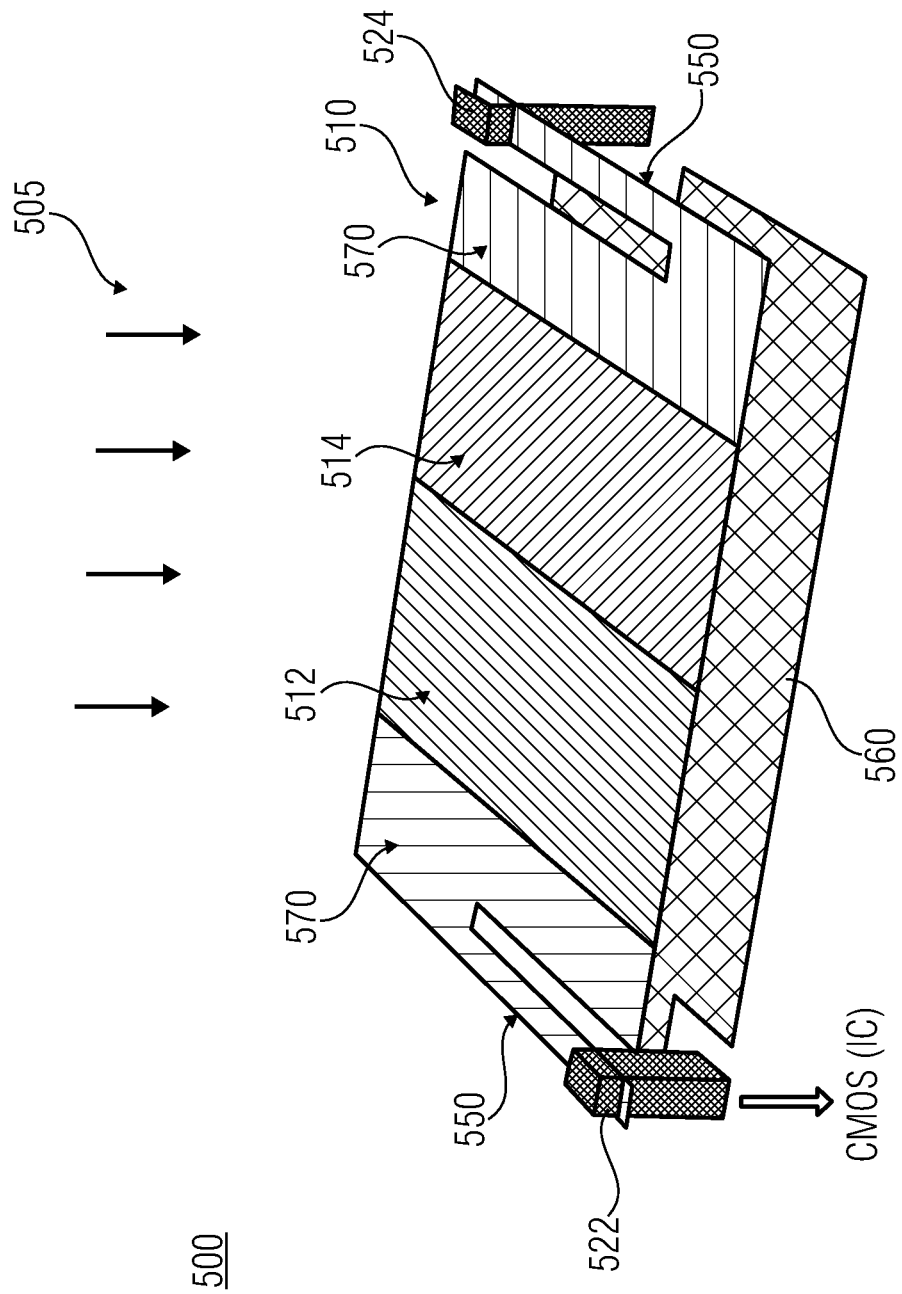

With reference to the embodiments of FIGS. 1 to 4, a diode of the multitude of diodes may be a diode bolometer 500, as is depicted in FIGS. 5a and 5b by way of example.

FIG. 5a shows a schematic cross-sectional view of an embodiment of a diode bolometer 500. In particular, FIG. 5a shows an architecture of a bolometer pixel. As is depicted in FIG. 5a, the diode bolometer 500 comprises a sensor element 510, a support structure 520 and a readout circuit 530. The sensor element 510 shown in FIG. 5a comprises a semiconductor layer 512 of a first doping type (e.g. n-doped layer) and a semiconductor layer 514 of a second doping type (e.g. p-doped layer). In this context, the n-doped layer and the p-doped layer may be configured as silicon layers, for example. The sensor element 510 of the diode bolometer 500 may additionally comprise a boron and argon implantation layer 518. As is shown in FIG. 5a, the semiconductor layers 512, 514 may be arranged on a TiN layer 516. The support structure 520 of the diode bolometer 500 comprises first and second support posts 522, 524. The support posts 522, 524 shown in FIG. 5a are configured to attach the sensor element 510 at a distance from a substrate 501 (CMOS wafer) such that it is freely suspended. The readout circuit 530 comprising the controller may be arranged on the substrate 501. In particular, the controller of the readout circuit 530 is configured to electrically connect the sensor element 510 to the readout circuit via the first and second support posts 522, 524.

FIG. 5b shows a perspective view of the embodiment of the diode bolometer 500 and/or of the architecture of the bolometer pixel of FIG. 5a. As is shown in FIG. 5b, the sensor element 510 comprises thermal insulation areas 550 formed between the semiconductor layer 512 of the first doping type and an upper end of the first support post 522 and between the semiconductor layer 514 of the second doping type and an upper end of the second support post 524. In embodiments, the thermal insulation areas 550 serve to thermally insulate that area of the sensor element 510 which is formed by the first and second semiconductor layers 512, 514 against the support posts. Areas 570 comprising electrically conductive material, such as $Si_2O$, may be provided between the thermal insulation areas 550 and the semiconductor layers 512, 514. The support posts 522, 524 may be arranged on a CMOS. The diode bolometer 500 shown in FIG. 5b may further comprise a reflection layer 560 arranged below the sensor element 510, for example on the substrate. The reflection layer 560 of the diode bolometer 500 operates to reflect incident radiation 505, such as infrared radiation, for example, so that the reflected radiation is absorbed by the sensor element 510, which results in said sensor element 510 heating up. Said heating up of the sensor element 510, which is caused by the absorption of the incident and/or reflected radiation, may be determined by detecting a change in an electric resistance along a junction of the semiconductor layer 512 of the first doping type and the semiconductor layer 514 of the second doping type. Thus, a sensor value which describes the radiation 505 impinging on the diode and/or the bolometer pixel may be detected at a diode and/or at the diode bolometer 500.

Figure 6:
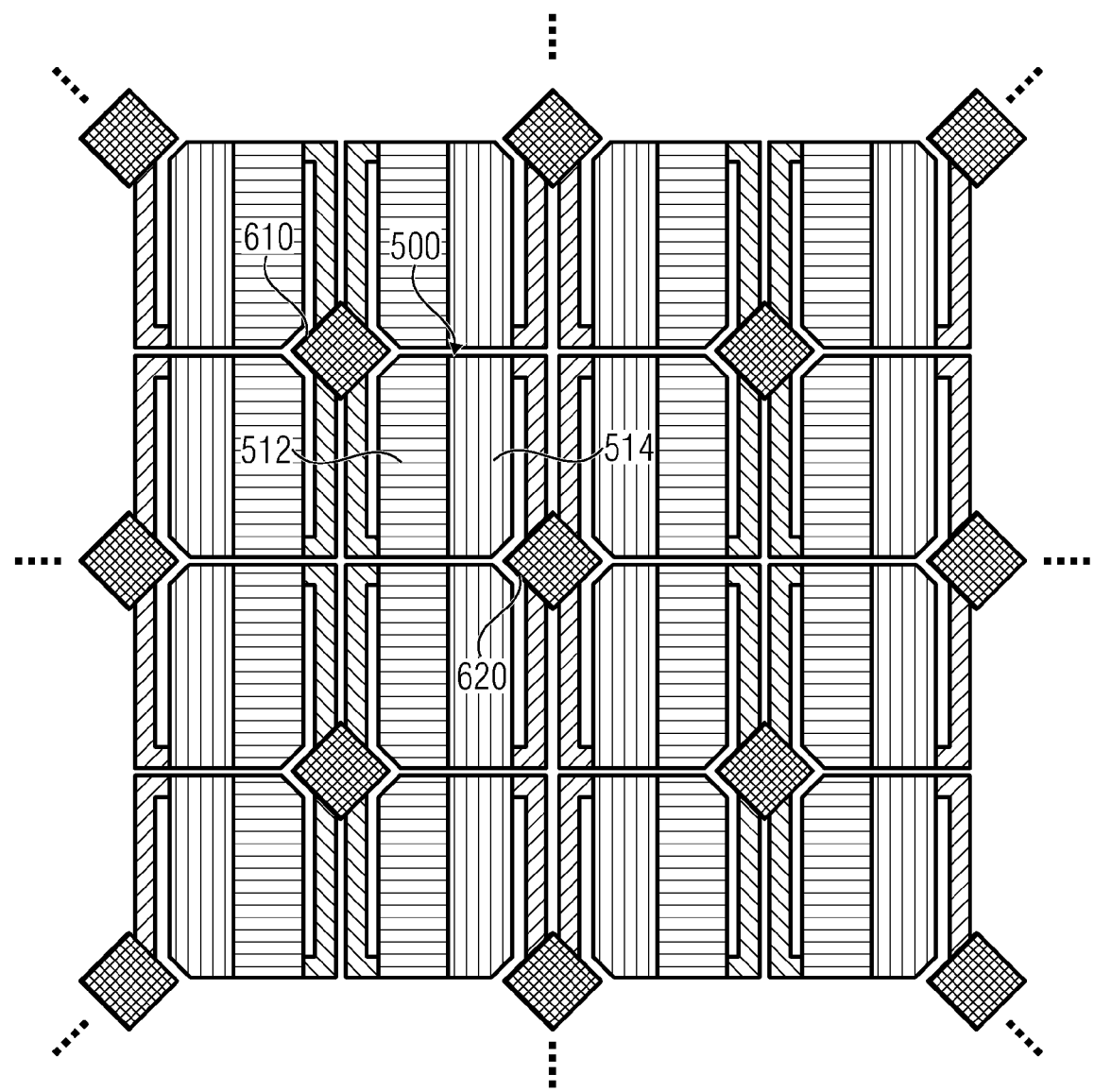
FIG. 6 shows a schematic representation of an embodiment of a diode sensor matrix comprising two shared support posts, respectively.

FIG. 6 shows a schematic representation of an embodiment of a diode sensor matrix 600 and/or of a bolometer matrix comprising two shared support posts 610, 620, respectively. The diode sensor matrix 600 includes several diodes and/or pixels, it being possible for each pixel of the diode sensor matrix 600 to be configured as the diode bolometer 500 shown in FIGS. 5a, 5b. FIG. 6 shows the semiconductor layers 512, 514 of the diode bolometer 500. In the diode sensor matrix 600 shown in FIG. 6, the support posts 610, 620 are shared by a diode and/or a pixel (e.g. diode bolometer 500) and by surrounding diodes and/or pixels. In this context, the diode sensor matrix 600 shown in FIG. 6 essentially corresponds to the diode sensor matrix 300; 400 shown in FIG. 3 or 4.

Figure 7:
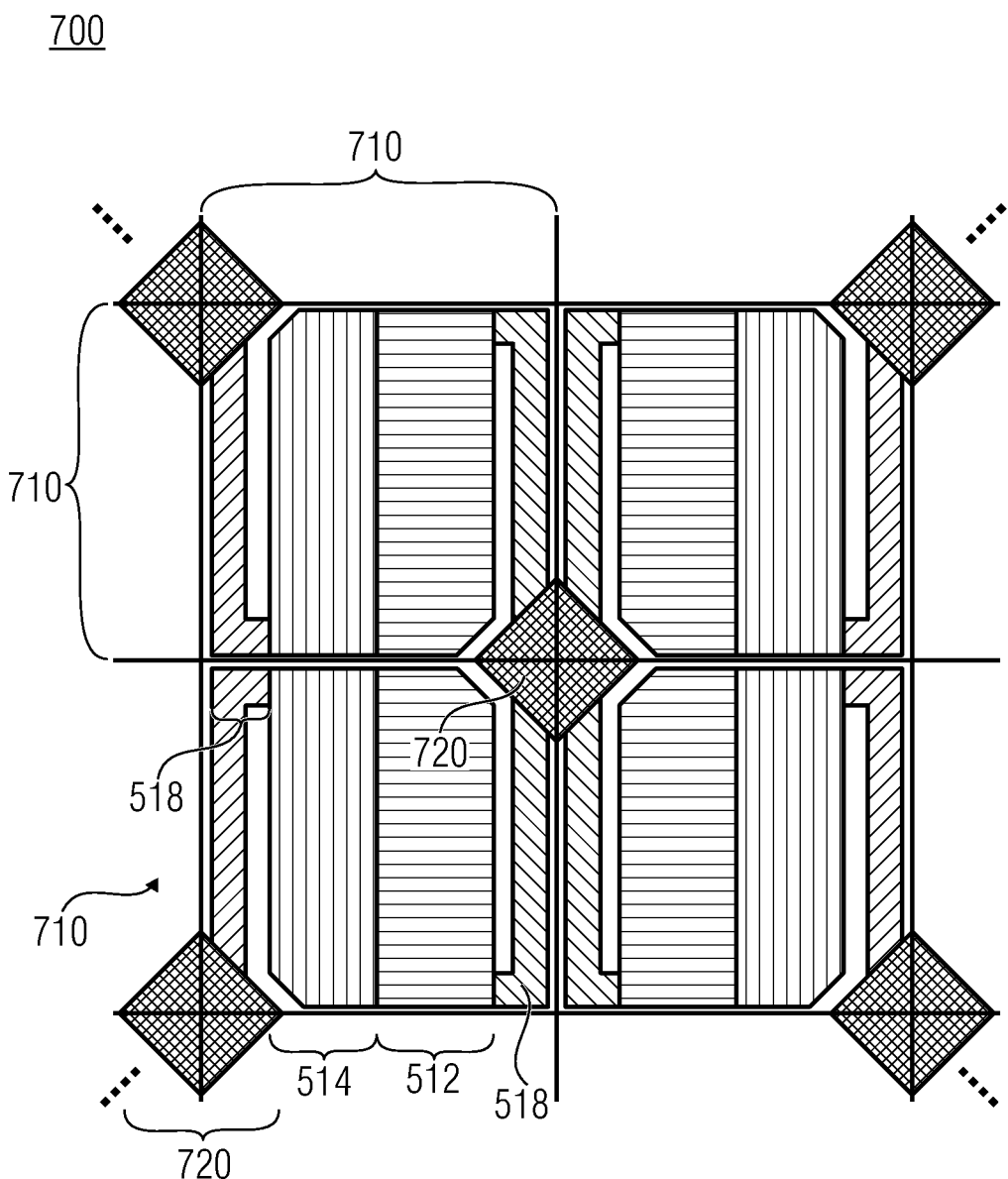
FIG. 7 shows a schematic representation of part of the embodiment of the diode sensor matrix in accordance with FIG. 6.
Figure 8:
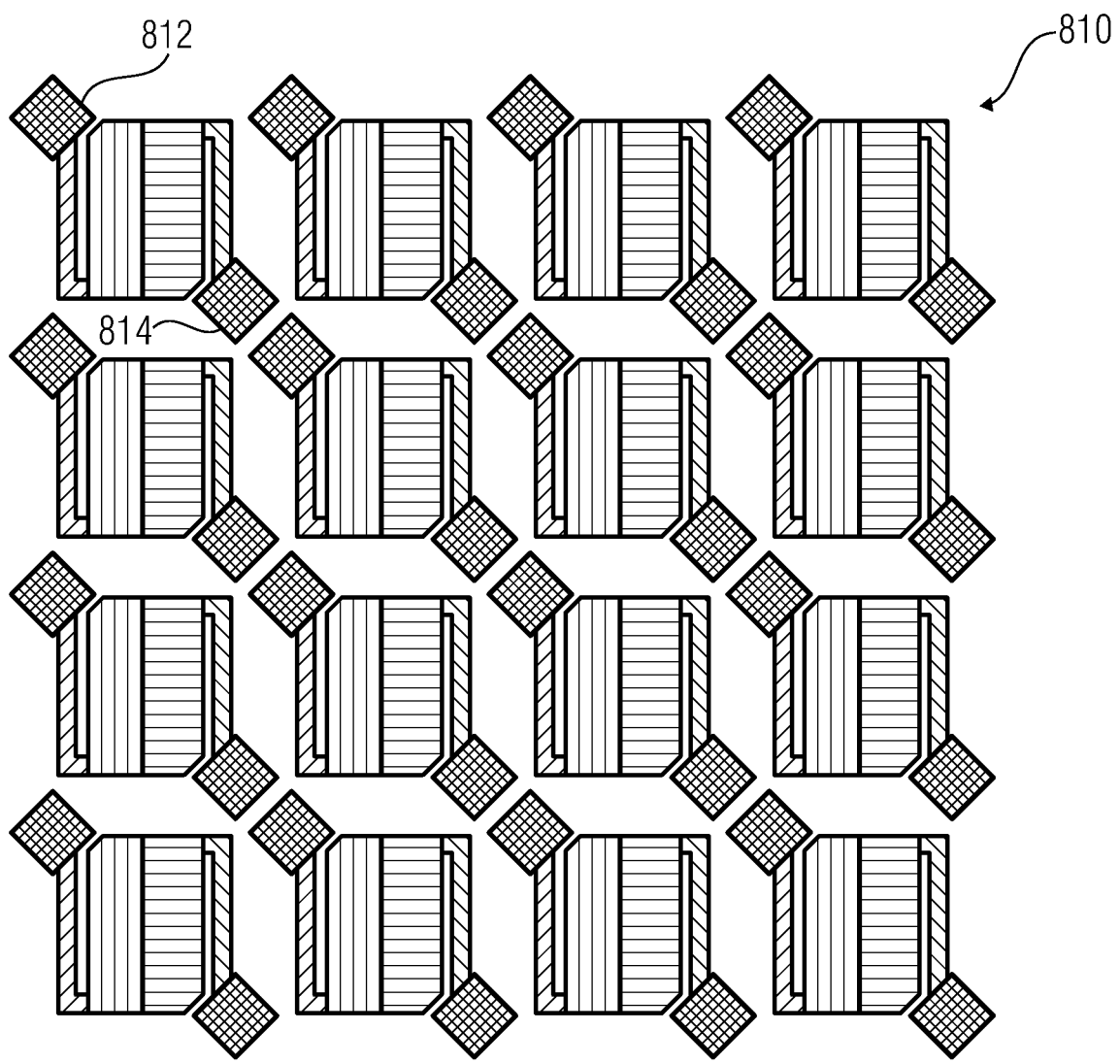
FIG. 8 shows a schematic representation of a bolometer matrix without any shared support post in accordance with conventional technology.
Figure 9:
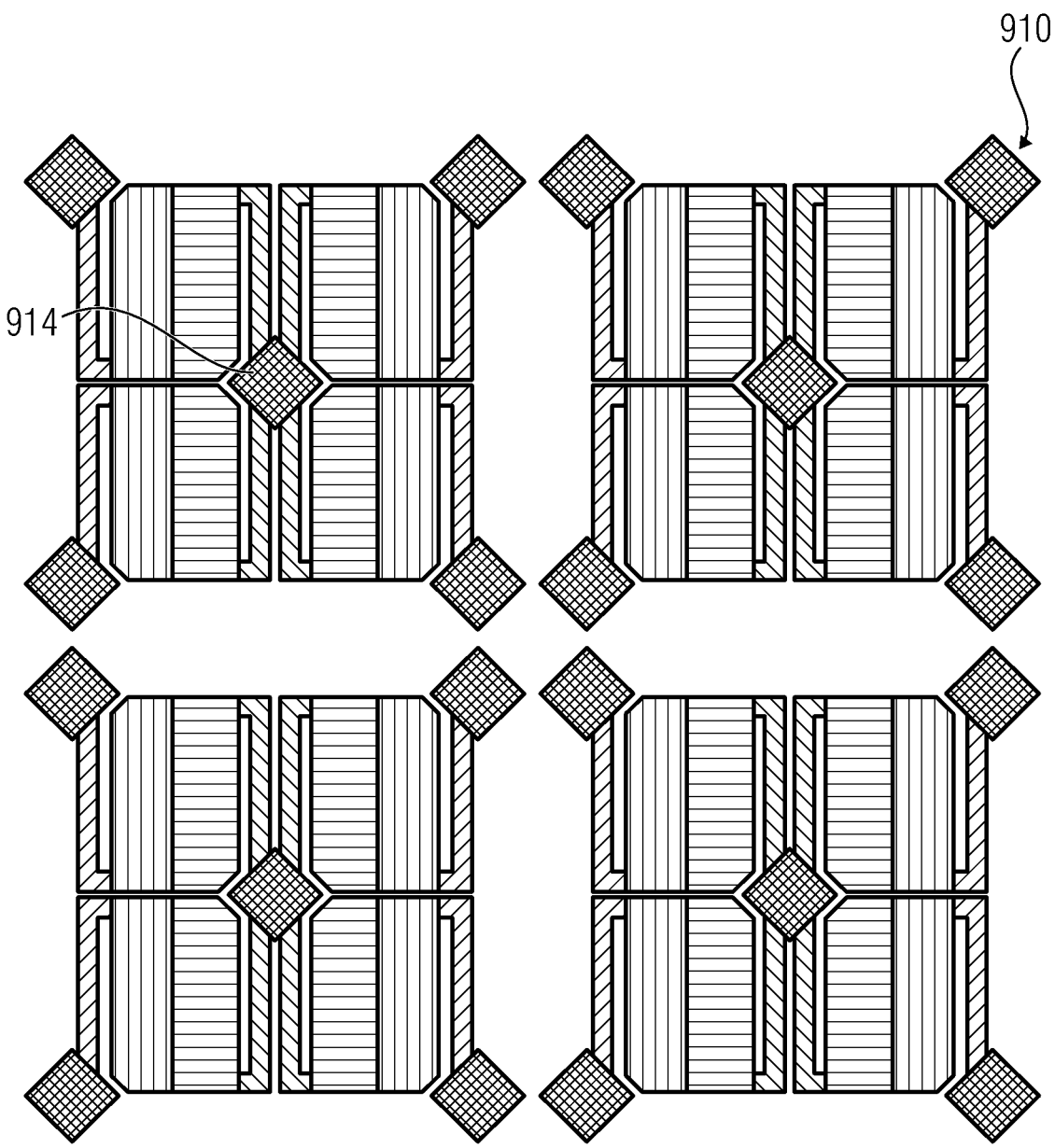
FIG. 9 shows a schematic representation of a bolometer matrix comprising a shared support post in accordance with conventional technology.

FIG. 7 shows a schematic representation of a part 700 of the embodiment of the diode sensor matrix 600 of FIG. 6. In particular, FIG. 7 shows a bolometer matrix having a diode structure. Part 700 of the embodiment of the diode sensor matrix 600 includes a diode (e.g. pixel 710), which may be configured as the diode bolometer 500 shown in FIGS. 5a, 5b. In FIG. 7, the pixel 710 comprises the first semiconductor layer 512 of the first doping type (e.g. phosphorous implantation area), the second semiconductor layer 514 of the second doping type (e.g. boron implantation area) and the areas 518 (e.g. argon and boron implantation areas) that are arranged between the support posts 720 and the semiconductor layers 512, 514 and comprising electric/thermal contacting.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device), such as a microprocessor, a programmable computer or an electronic circuit. In some embodiments, some or several of the most important method steps may be performed by such a device.

A sensor signal detected in accordance with the invention may be stored on a digital storage medium or may be transmitted on a transmission medium such as a wireless transmission medium or a wired transmission medium, such as the internet, for example.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

The above-described embodiments merely represent an illustration of the principles of the present invention. It is understood that other persons skilled in the art will appreciate any modifications and variations of the arrangements and details described herein. This is why the invention is intended to be limited only by the scope of the following claims rather than by the specific details that have been presented herein by means of the description and the discussion of the embodiments.

In summary, sensor elements of the diode type (FIG. 7) may be used, which may be arranged in a bolometer matrix as in FIG. 6. By means of this arrangement, one may achieve that each terminal of a sensor element shares a support post with three other terminals, respectively, so that the number of support posts per sensor element now amounts to only 0.5.

For reading out a sensor element in this arrangement it should be guaranteed that the surrounding sensor elements do not have a disturbing effect. To this end, their diode characteristics may be exploited in that said diodes are polarized in the reverse direction. Thus, if a sensor element is connected, with its anode, to the same support post as the sensor element to be measured, a higher voltage V+ may be applied to the cathode. Accordingly, a low voltage V− may be applied to the anode of a sensor element which shares, with its cathode, a support post with the sensor element to be measured (see FIG. 1). With reference to the detailed illustration in FIG. 2, only two switches may be used for each support post—one switch for connection with one of the two constant voltages V+ and V−, the other switch for connection with one of the two terminals of the electronic readout system. When a readout is performed in the flow direction of the diode, the voltage at S+ may be larger than that at S−. As long as the voltages applied by the controller and/or electronic readout system to the cathode and anode of the sensor element to be measured remain between V+ and V−, the surrounding diodes can be blocked and thus will not contribute to the measuring result.

Since said constraints affect the directly surrounding sensor elements only, several sensor elements in a matrix may be read out simultaneously. As a generalization of the above rules, the anodes and cathodes of all of the sensor elements to be measured are then connected to the readout circuit. The support posts not associated with the sensor elements to be measured may be connected to V+ if the sensor elements connected thereto are connected with their cathodes, and they may be connected to V−, when they are connected with their anodes. Any current paths in the matrix which are not associated with the measurement will then be blocked (see FIG. 3).

Since the voltages V− and V+ may be the same for all columns, they may be distributed horizontally and vertically as desired. By implication, this means that readout may not only occur simultaneously for elements at the same level (horizontally in a row), but also vertically and also within a plane. The latter is made possible by the fact that the silicon surface area below the sensor elements to a large extent is freely available for circuits. Therefore, the matrix may be subdivided into smaller sub-matrices (down to one single sensor element) whose elements may be successively read out by a readout circuit. Such an arrangement may exploit the parallelism shown in FIG. 3. Said parallelism is far more pronounced than that in the case of column-by-column or row-by-row readout, as a result of which the multiplexing factor decreases and the readout time per sensor element increases while the readout rate of the matrix (image replication rate) is constant, which entails an improvement of the signal resolution.

In the event that one of the terminals S+ or S− of the controller and/or electronic readout system has a constant voltage, the amount of parallelism shown in FIG. 3 may be further increased in embodiments, and thus the multiplexing factor may advantageously be reduced from 9:1 to 4:1 (see FIG. 4).

Generally, in integrated area sensors, the sensitivity of an individual pixel is dependent on the surface area that is available for converting the physical or chemical measurand to an electrical signal. The larger the surface area, the more sensitive the sensor will be. On the other hand, the overall surface area of the sensor is to be kept as small as possible so as to reduce product cost. By reducing the size of the overall design, further fields of application may be opened up. Embodiments of the present invention provide a diode sensor matrix wherein the ratio of the effective sensor area and the overall area and/or area utilization is optimized.

An advantage in the inventive diode sensor matrix is that the other and/or surrounding sensor elements do not disturb readout of a sensor element to be read out.

Embodiments of the present invention provide a diode sensor matrix wherein the number of support posts per sensor element is minimized, which is advantageous in particular for very small sensors, since the surface areas of the support posts do not contribute to the effective sensor area. By means of the inventive arrangement, area utilization of the sensor may be clearly improved. Thus, increased sensitivity may be achieved while the surface area of a sensor pixel remains the same.

In IMS technology, for example, one achieves following estimated area utilization given an assumed pixel edge length of 17μ. Without any shared support posts, one achieves area utilization of $150\mu^2/289\ \mu m^2$, with one shared support post, one achieves area utilization of $180\mu^2/289\ \mu m^2$, and with two shared support posts, one achieves area utilization of $210\mu^2/289\ \mu m^2$ (i.e. the maximum area utilization).

Embodiments of the present invention provide a diode sensor matrix which enables readout of same to be parallelized, as a result of which the resolution of the sensor signals may be improved.

However, it shall be noted that the above embodiments are applicable to any type of diode array, i.e. also to diodes which serve other purposes than bolometric measurement, and/or are of different types than those described above by way of example, such as vertical diodes, bolometer diodes having vertical pn-junctions or the like. The number of cycles for full array scanning is also variable and may also be different than was depicted above by way of example.

Embodiments of the present invention may be utilized in far-infrared bolometers. They are employed, inter alia, in testing techniques (detecting heat images of technical devices and installations or house fronts), military technology (night-time visibility devices) and automobile technology (driving assistance for night-time driving).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A diode sensor matrix comprising a multitude of diodes, wherein each of the diodes shares one anode terminal with at least one other diode and one cathode terminal with at least one further, different diode, the diode sensor matrix being configured to detect, in a first measuring cycle, a first sensor value at a first diode or, respectively, at diodes of a first group of diodes which share at least one anode or cathode terminal amongst themselves, respectively, specifically while operating the first diode and/or the diodes of the first group in the flow direction and while operating the diodes, which share an anode or cathode or terminal with the first diode or with any of the diodes of the first group, in the reverse direction, and to detect, in a second measuring cycle, a second sensor value at a second diode among the diodes which share an anode or cathode terminal with the first diode or with any of the diodes of the first group, specifically while operating the second diode in the flow direction and while operating the first diode or a diode from the first group, with which the second diode shares an anode or cathode terminal, in the reverse direction;

the diode sensor matrix further comprising
a first plurality of control lines configured to provide a first measuring potential or a second measuring potential;
a second plurality of control lines configured to provide a first blocking potential and a second blocking potential; and
a controller configured to connect the respective anode or cathode terminal of a diode of the multitude of diodes to a control line of the first multitude of control lines or to a control line of the second plurality of control lines in a switchable manner.

2. The diode sensor matrix as claimed in claim 1, further comprising a controller configured, in the first measuring cycle, to apply a first measuring potential to the anode terminal and a second measuring potential to the cathode terminal of the first diode, and configured, in the second measuring cycle, to apply the first measuring potential to the anode terminal and the second measuring potential to the cathode terminal of the second diode.

3. The diode sensor matrix as claimed in claim 2, further comprising a controller configured to apply, in the first measuring cycle, a first blocking potential to the cathode terminals of the diodes, which share an anode terminal with the first diode, and to apply a second blocking potential to the anode terminals of the diodes which share a cathode terminal with the first diode, and to apply, in the second measuring cycle, the first blocking potential to the cathode terminals of the diodes which share an anode terminal with the second diode, and to apply the second blocking potential to the anode terminals of the diodes which share a cathode terminal with the second diode; in the first and second measuring cycles, the first measuring potential being larger than the second measuring potential, and in the first and second measuring cycles, the first measuring potential being smaller than the first blocking potential, and the second measuring potential being larger than the second blocking potential.

4. The diode sensor matrix as claimed in claim 2, wherein a number of cycles of reading out the diode sensor matrix is nine when the sensor values are detected at the first and second diodes.

5. The diode sensor matrix as claimed in claim 1, further comprising a controller configured, in the first measuring cycle, to apply a first measuring potential to the at least one shared anode or cathode terminal, respectively, and to apply a second measuring potential to the other cathode or anode terminal of the diodes of the first group, respectively, and configured, in the second measuring cycle, to apply the first measuring potential to a shared anode or cathode terminal of diodes of a second group, respectively, which comprises the second diode, and to apply the second measuring potential to the other cathode or anode terminal, respectively, of the diodes of the second group.

6. The diode sensor matrix as claimed in claim 5, further comprising a controller configured to apply, in the first measuring cycle, a respective first blocking potential to the cathode terminals of the diodes which share an anode terminal with any of the diodes of the first group, and to apply, in the second measuring cycle, the first blocking potential to the cathode terminals of the diodes which share an anode terminal with any of the diodes of the second group, when the diodes of the first and second groups share at least the cathode terminal amongst themselves, respectively, and to apply, in the first measuring cycle, a second blocking potential to the anode terminals of the diodes which share a cathode terminal with any of the diodes of the first group, and to apply, in the second measuring cycle, the second blocking potential to the anode terminals of the diodes which share a cathode terminal with any of the diodes of the second group, when the diodes of the first and second groups share at least the anode terminal amongst themselves, wherein in the first and second measuring cycles, the second measuring potential applied to the respective other anode terminal is larger than the first measuring potential applied to the at least one shared cathode terminal, and wherein in the first and second measuring cycles, the second measuring potential applied to the respective other anode terminal is smaller than the first blocking potential when the diodes of the first and second groups share at least the cathode terminal amongst themselves, respectively, and wherein in the first and second measuring cycles, the first measuring potential applied to the at least one shared anode terminal is larger than the second measuring potential applied to the respective other cathode terminal, and wherein in the first and second measuring cycles, the second measuring potential applied to the respective other cathode terminal is larger than the second blocking potential when the diodes of the first and second groups share at least the anode terminal amongst themselves, respectively.

7. The diode sensor matrix as claimed in claim 5, wherein a number of the diodes of the first and second groups is four.

8. The diode sensor matrix as claimed in claim 5, wherein a number of cycles for reading out the diode sensor matrix is four when the sensor values are detected at the diodes of the first group and at the diodes of the second group, respectively.

9. The diode sensor matrix as claimed in claim 1, wherein each of the diodes shares the anode terminal and the cathode terminal with three other diodes.

10. The diode sensor matrix as claimed in claim 1, wherein a diode of the multitude of diodes is a diode bolometer.

11. The diode sensor matrix as claimed in claim 1, wherein a diode of the multitude of diodes is a diode bolometer, the diode bolometer comprising
  a sensor element comprising a semiconductor layer of a first doping type and a semiconductor layer of a second doping type;
  a support structure comprising first and second support post configured to attach the sensor element at a distance from a substrate such that it is freely suspended; and
  a readout circuit comprising a controller, the readout circuit being arranged on the substrate, and the controller being configured to electrically connect the sensor element to the readout circuit via the first and second support posts.

12. The diode sensor matrix as claimed in claim 11, wherein the sensor element comprises thermal insulation areas formed between the semiconductor layer of the first doping type and an upper end of the first support post, and between the semiconductor layer of the second doping type and an upper end of the second support post.

13. A method of reading out a diode sensor matrix comprising a multitude of diodes, wherein each of the diodes shares one anode terminal with at least one other diode and one cathode terminal with at least one further, different diode, the method comprising:
  detecting a first sensor value at a first diode or at diodes of a first group of diodes, respectively, which share at least one anode or cathode terminal amongst themselves, respectively, in a first measuring cycle, specifically while operating the first diode and/or the diodes of the first group in the flow direction and while operating the diodes, which share an anode or cathode terminal with the first diode or any of the diodes of the first group, in the reverse direction; and
  detecting a second sensor value at a second diode among the diodes, which shares an anode or cathode terminal with the first diode or any of the diodes of the first group, in a second measuring cycle, specifically while operating the second diode in the flow direction, and while operating the first diode or a diode from the first group, with which the second diode shares an anode or cathode terminal, in the reverse direction;
  providing a first plurality of control lines configured to provide a first measuring potential or a second measuring potential;
  providing a second plurality of control lines configured to provide a first blocking potential or a second blocking potential; and
  connecting the respective anode or cathode terminal of a diode of the multitude of diodes to a control line of the first plurality of control lines or to a control line of the second plurality of control lines in a switchable manner.

\* \* \* \* \*